B. T. BABBITT,
Improvement in Soap-Boiling Apparatus.
No. 132,043.  Patented Oct. 8. 1872.
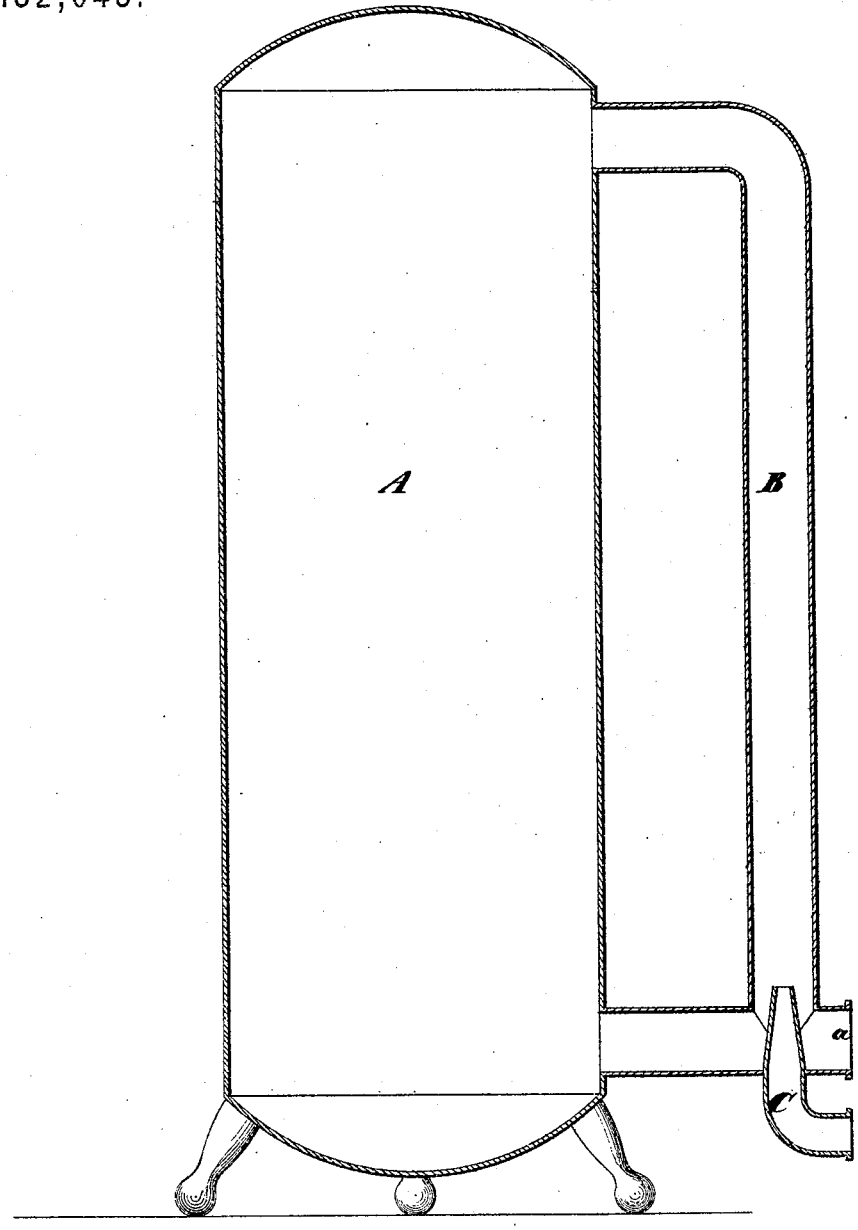
Witnesses:  
Benjamin T. Babbitt  
per Brown & Allen  
Attorneys

UNITED STATES PATENT OFFICE.

BENJAMIN T. BABBITT, OF NEW YORK, N. Y.

IMPROVEMENT IN SOAP-BOILING APPARATUS.

Specification forming part of Letters Patent No. 132,043, dated October 8, 1872.

*To all whom it may concern:*

Be it known that I, BENJAMIN T. BABBITT, of the city, county, and State of New York, have invented an Improved Apparatus for Making Soap under Pressure, of which the following is a specification:

This invention relates to the manufacture of soap under heat and pressure. It consists in the combination, with a close vessel or receptacle for the oils or fatty matters and lye to produce saponification, of what may be termed a circulation-pipe, communicating with the aforesaid vessel near its top and bottom, and a steam-jet or injection-pipe intersecting the pipe just mentioned in such manner as to produce, by the force of steam issuing from the pipe, and the suction created thereby around the exterior of the jet-pipe, a perfect circulation in the vessel and a thorough mixing of its contents.

The accompanying drawing represents a central vertical section of an apparatus constructed according to my invention.

A is the vessel or receptacle for containing the oils or fatty matters and lye for producing saponification. As has before been stated, it is closed at the top and bottom, and has communicating with it near these parts the circulation-pipe B, which extends parallel with the length of the vessel. This pipe B is provided near the bottom with a branch, *a*, which may form the outlet of the apparatus. Instead of this branch, however, the bottom of the vessel A may be provided with a gate or opening for the outlet. C is the steam-pipe. It intersects the circulation-pipe at the junction of its vertical or lower horizontal portions and projects some distance into the pipe. Its end is tapered slightly to form a nozzle from which the steam may issue in a jet. The vessel A is first filled through a suitable inlet with the substances for making soap. Steam is then admitted to the circulation-pipe through the steam-pipe C, and passing up the circulation-pipe mingles with the contents of the vessel A, heating them and creating a pressure upon them. As the steam issues from the nozzle it carries up with it the contents of the circulation-pipe, while, at the same time, a suction is produced from the vessel toward the lower part of the circulation-pipe, and by these means a downward circulation of the contents of the vessel is produced. The circulation-pipe B being considerably smaller in diameter than the vessel A, an active and intense agitation of the contents of the lower portion of the said vessel is produced, and by this means the substances contained in the apparatus are very effectually mixed and very thoroughly saponified. As soon as saponification is completed the contents of the apparatus are removed through the outlet provided for that purpose.

A great advantage possessed by this apparatus over others employed for the same purpose is that no mechanism is employed either for producing the agitation of the contents of the apparatus by stirring or heating, or for producing the same effect by a circulation through them.

Claim.

The combination, with the close vessel A, of the circulation-pipe B and steam-jet pipe C, substantially as and for the purpose set forth.

BENJAMIN T. BABBITT.

Witnesses:
 C. R. BECKWITH,
 E. F. GIBBONS.